(12) United States Patent
Kim et al.

(10) Patent No.: US 10,756,810 B2
(45) Date of Patent: Aug. 25, 2020

(54) MULTI-ACCESS METHOD AND APPARATUS FOR LORA TAG USING BACKSCATTER COMMUNICATION

(71) Applicant: Pusan National University Industry-University Cooperation Foundation, Busan (KR)

(72) Inventors: Jong-Deok Kim, Busan (KR);
JunHwan Huh, Busan (KR);
Seung-gyu Byeon, Busan (KR);
Dong-Hyun Kim, Busan (KR);
Jae-Min Lee, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 16/698,489

(22) Filed: Nov. 27, 2019

(65) Prior Publication Data

US 2020/0204251 A1    Jun. 25, 2020

(30) Foreign Application Priority Data

Dec. 19, 2018   (KR) .......................... 10-2018-0164899

(51) Int. Cl.
*H04B 7/22*     (2006.01)
*H04W 72/12*    (2009.01)
*H04W 74/08*    (2009.01)

(52) U.S. Cl.
CPC .......... *H04B 7/22* (2013.01); *H04W 72/1289* (2013.01); *H04W 74/0816* (2013.01)

(58) Field of Classification Search
None
See application file for complete search history.

(56) References Cited

U.S. PATENT DOCUMENTS

2020/0007188 A1\*   1/2020   Ning ..................... H04B 17/345
2020/0052734 A1\*   2/2020   Talla ....................... H04B 1/69

FOREIGN PATENT DOCUMENTS

KR       10-1837684          3/2018
KR       10-2018-0076852     8/2018

\* cited by examiner

*Primary Examiner* — Adnan Baig
(74) *Attorney, Agent, or Firm* — Hayes Soloway PC

(57) ABSTRACT

Proposed are a multi-access method and apparatus for a LoRa tag using backscatter communication. The multi-access apparatus for a LoRa tag using backscatter communication may include a contention slot unit configured to receive a signal for a contention participation request from a base station and participate in a contention according to a distributed queuing (DQ) protocol using a backscatter signal if data to be transmitted is present, an FBP unit configured to receive a result of the contention from the base station and check whether the result of the contention is a success, and a data slot unit configured to transmit sensed data to the base station using the backscatter signal if the result of the contention is a success.

8 Claims, 9 Drawing Sheets

———▶ downlink (backscatter generation signal)
◀------ uplink (backscatter signal)

MULTI-ACCESS METHOD AND APPARATUS FOR LORA TAG USING BACKSCATTER COMMUNICATION

CROSS REFERENCE TO RELATED APPLICATION

This application is based on and claims priority under 35 U.S.C. 119 to Korean Patent Application No. 10-2018-0164899, filed on Dec. 19, 2018, in the Korean Intellectual Property Office, the disclosures of which is herein incorporated by reference in their entireties.

BACKGROUND OF THE INVENTION

1. Technical Field

The following embodiments relate to a multi-access method and apparatus for a LoRa tag using backscatter communication.

2. Description of the Related Art

Backscatter communication means that radio waves are scattered in a direction opposite a progress direction. In the ITS field DSRC, backscatter is known as a passive tag system, which is opposite an active tag system.

An example of backscatter communication includes radio-frequency identification (RFID) communication. In general, RFID communication includes a base station transceiver for broadcasting or transmitting electromagnetic energy and interpreting data from the reflection of the broadcasted electromagnetic energy. A tag reflects part of electromagnetic energy that returns to a base station in order to communicate data to a reader. In order to encode data (e.g., ID number) of the reflected part, a passive tag (not having a battery) may gather power from the broadcasted electromagnetic energy and modulate electromagnetic energy, reflected toward the base station again, using the gathered power. In contrast, a tag for battery power supplies power to a circuit for modulating electromagnetic energy, reflected toward a base station again, using a battery. In general, passive tags have a shorter range than tags for battery power.

LoRa (long-range sub-Ghz module) is network communication for a middle distance (1 km or more) that configures a network using radio communication of 915 Mhz, and is also called a LoRaWAN. LoRa is one of low power wide area network (LPWAN) technology standards. LoRa has lower power and better efficiency than the existing Zigbee or WI-FI communication module, and has an effective distance of 1 km or more compared to the existing communication method having a short effective distance of 100 m or less. LoRa supports long distance communication.

Furthermore, LoRa has high reliability of received data because it automatically discovers another channel not having interference and enables transmission if interference is present in a specific channel. Lora has high security because it transmits encrypted data of an AES64 method upon radio transmission, and can connect several devices for client at the same time.

FIG. 1 is a diagram schematically showing a conventional LoRa network.

Referring to FIG. 1, a conventional LoRa network 1 may include a LoRa gateway 10 and a LoRa tag 20. In this case, the LoRa tag 20 may include a plurality of LoRa tags, and may include a first LoRa tag 21 and a second LoRa tag 22, for example. In this case, the first LoRa tag 21 and second LoRa tag 22 of the plurality of LoRa tags 20 are described as an example. Furthermore, the first LoRa tag 21 and the second LoRa tag 22 may be connected to respective batteries 30.

FIG. 2 is a diagram for describing an operation of the conventional LoRa network.

Referring to FIG. 2, in the conventional LoRa network, the first LoRa tag 21 and the second LoRa tag 22 may transmit sensing data to the LoRa gateway 10. However, there is a problem in that a collision occurs in the LoRa gateway if a plurality of sensing data is transmitted.

Korean Patent Application Publication No. 10-2018-0076852 relates to a system and method for tracking things in a non-line of a sight area using such LoRa communication, and describes a technology related to an apparatus for identifying information of things not received by a base station, wherein a surrounding node of a corresponding thing receives a signal instead and transmits the signal to a cloud system.

PRIOR ART DOCUMENT

Patent Document (Patent Document 1) Korean Patent Application Publication No. 10-2018-0076852

SUMMARY OF THE INVENTION

Embodiments describe a multi-access method and apparatus for a LoRa tag using backscatter communication, and more specifically, provide a backscatter LoRa network technology capable of multi-access without a collision by enabling participation in a contention according to a distributed queuing (DQ) protocol using a backscatter signal.

Embodiments provide a multi-access method and apparatus for a LoRa tag using backscatter communication, in which when a LoRa gateway periodically transmits a signal, a LoRa backscatter tag that has received the signal participates in a contention by transmitting an ARS signal and transmits data based on a received result of the contention.

In an embodiment, a multi-access apparatus for a LoRa tag using backscatter communication may include a contention slot unit configured to receive a signal for a contention participation request from a base station and participate in a contention according to a distributed queuing (DQ) protocol using a backscatter signal if data to be transmitted is present, a feedback packet (FBP) unit configured to receive a result of the contention from the base station and check whether the result of the contention is a success, and a data slot unit configured to transmit sensed data to the base station using the backscatter signal if the result of the contention is a success.

The contention slot unit may be configured to check whether the data to be transmitted is present in a LoRa backscatter tag, select a contention slot if the data to be transmitted is present, and participate in a contention by transmitting an access request sequence (ARS) signal.

The FBP unit may be configured to receive, from the base station, FBP information including whether the result of the contention is a success.

After receiving the result of the contention from the base station, the data slot unit may receive a signal for a data transmission request from the base station and prepares the generation and transmission of a backscatter signal using the signal for the data transmission request.

The contention slot unit may be configured to independently maintain and manage a conflict resolution queue (CRQ) and a data transmission queue (DTQ) and to participate in a contention. The data slot unit may be configured to transmit, to the base station, the data according to the rules of the CRQ and DTQ if the result of the contention is a success.

In another embodiment, a multi-access method for a LoRa tag using backscatter communication may include receiving, by a LoRa backscatter tag, a signal for a contention participation request from a base station, preparing, by the LoRa backscatter tag that has received the signal for the contention participation request from the base station, the generation and transmission of a backscatter signal which is an uplink signal using the signal for the contention participation request, checking, by the LoRa backscatter tag, whether data to be transmitted is present, participating, by the LoRa backscatter tag, in a contention according to a distributed queuing (DQ) protocol using the backscatter signal if the data to be transmitted is present in the LoRa backscatter tag, receiving, by the LoRa backscatter tag, a result of the contention from the base station, checking, by the LoRa backscatter tag, whether the result of the contention is a success, and transmitting, by the LoRa backscatter tag, sensed data to the base station using the backscatter signal if the result of the contention is a success.

Participating, by the LoRa backscatter tag, in the contention according to the DQ protocol using the backscatter signal may include selecting, by the LoRa backscatter tag, a contention slot if the data to be transmitted is present and participating in the contention by transmitting an access request sequence (ARS) signal.

Receiving, by the LoRa backscatter tag, the result of the contention from the base station may include receiving, by the LoRa backscatter tag, feedback packet (FBP) information including whether the result of the contention is a success from the base station.

The multi-access method may further include receiving, by the LoRa backscatter tag, a signal for a data transmission request from the base station after receiving the result of the contention from the base station, and preparing, by the LoRa backscatter tag that has received the signal for the data transmission request from the base station, the generation and transmission of a backscatter signal using the signal for the data transmission request.

Participating, by the LoRa backscatter tag, in the contention according to the DQ protocol using the backscatter signal may include independently maintaining and managing, by the LoRa backscatter tag, a conflict resolution queue (CRQ) and a data transmission queue (DTQ) and participating in the contention. Transmitting, by the LoRa backscatter tag, the sensed data to the base station using the backscatter signal if the result of the contention is a success may include transmitting the data to the base station according to the rules of the CRQ and DTQ.

DETAILED DESCRIPTION

Figure 1:
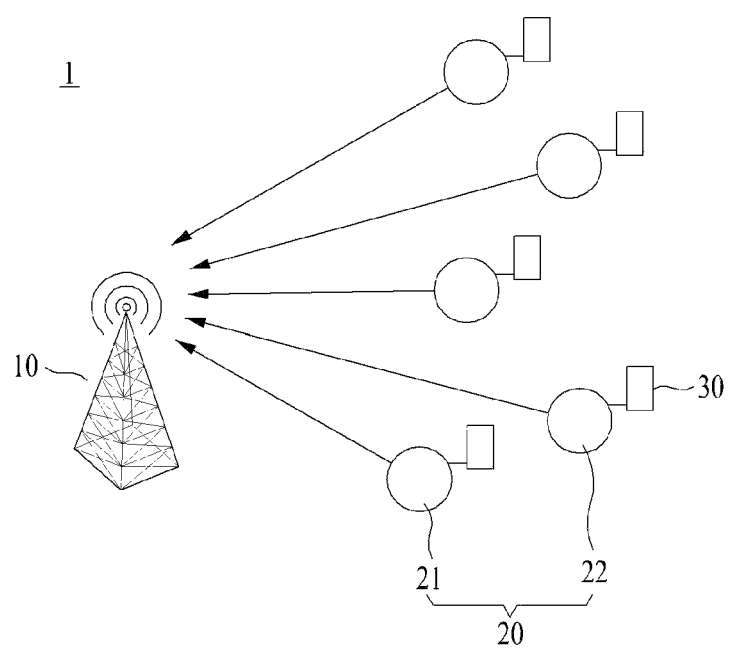
FIG. 1 is a diagram schematically showing a conventional LoRa network.
Figure 2:
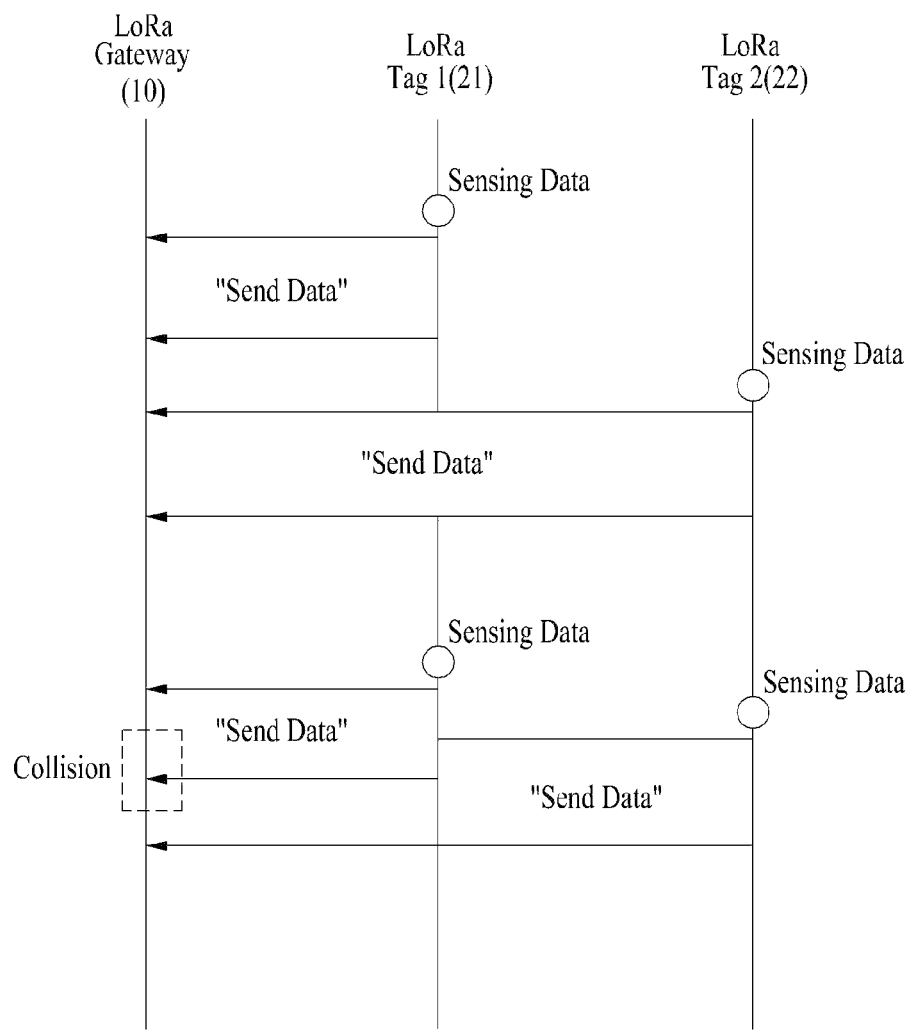
FIG. 2 is a diagram for describing an operation of the conventional LoRa network.

Hereinafter, embodiments of the disclosure are described in detail with reference to the accompanying drawings. However, the described embodiments may be modified in various other forms, and the scope of the disclosure is not restricted by the following embodiments. Furthermore, the embodiments of the disclosure are provided to fully describe the disclosure to a person having ordinary knowledge in the art to which the disclosure pertains. The shapes, sizes, etc. of elements in the drawings may be exaggerated for a clear description.

A multi-access method for a LoRa tag using backscatter communication based on a LoRaWAN according to the present disclosure enables the efficient use of a resource in a high-speed multi-channel environment using a conflict resolution queue (CRQ) for determining whether to transmit an access request sequence (ARS) in a current cycle and a data transmission queue (DTQ) for determining whether to transmit data in a current cycle.

To this end, in the present disclosure, when a LoRa gateway periodically transmits a signal, a LoRa backscatter tag that has received the signal may select a contention slot in a contention slot unit, and may transmit an ARS signal. Furthermore, a feedback packet (FBP) unit may receive an FBP including a result of a contention, may select a channel based on a result of the contention, and may transmit the selected channel through a data slot unit.

In the following description, a "contention slot unit" is the section in which a terminal randomly selects a contention slot and participates in a contention. An "FBP unit" is the section in which a result of a contention is notified. A "data slot unit" means the section in which data transmission is possible without a collision.

Such a multi-access method for a LoRa tag using backscatter communication is described specifically below.

Figure 3:
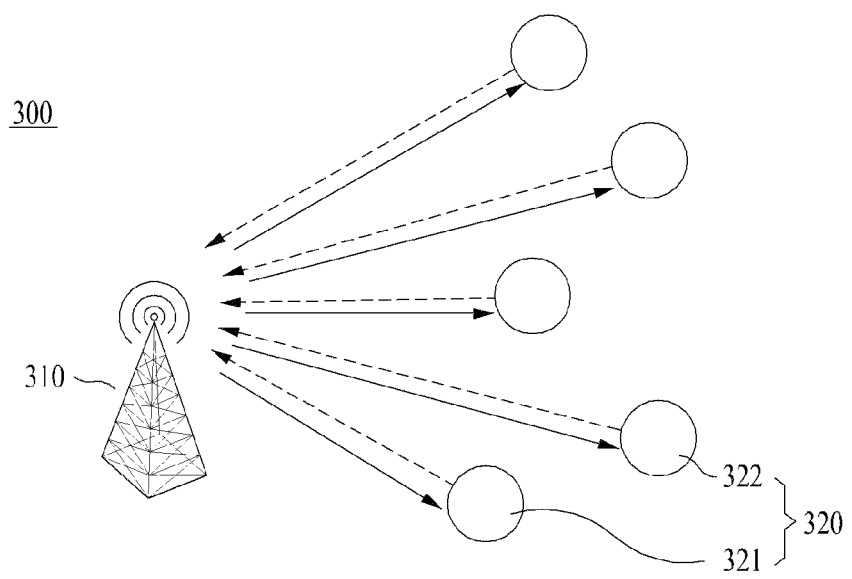
FIG. 3 is a diagram schematically showing a backscatter LoRa network according to an embodiment.

FIG. 3 is a diagram schematically showing a backscatter LoRa network 300 according to an embodiment.

Referring to FIG. 3, the backscatter LoRa network 300 according to an embodiment may include a LoRa gateway 310 and a LoRa backscatter tag 320.

The LoRa gateway 310 is a base station to which the LoRa technology has been applied. The LoRa gateway 310 functions to deliver data between the LoRa backscatter tag 320 and a LoRa network server, and may perform a base station protocol for LoRa communication and a LoRa network server interoperation function.

The LoRa backscatter tag 320 is a device to which the LoRa technology has been applied, and may perform a data transmission operation for each LoRa class and a packet encryption/decryption function. In this case, the LoRa backscatter tag 320 may be configured with a plurality of LoRa backscatter tags, and may include a first LoRa backscatter tag 321 and a second LoRa backscatter tag 322, for example. In this case, the first LoRa backscatter tag 321 and second LoRa backscatter tag 322 of the multiple LoRa backscatter tags 320 are described as an example. Furthermore, the first LoRa backscatter tag 321 and the second LoRa backscatter tag 322 do not require a battery unlike in a conventional LoRa network.

Figure 4:
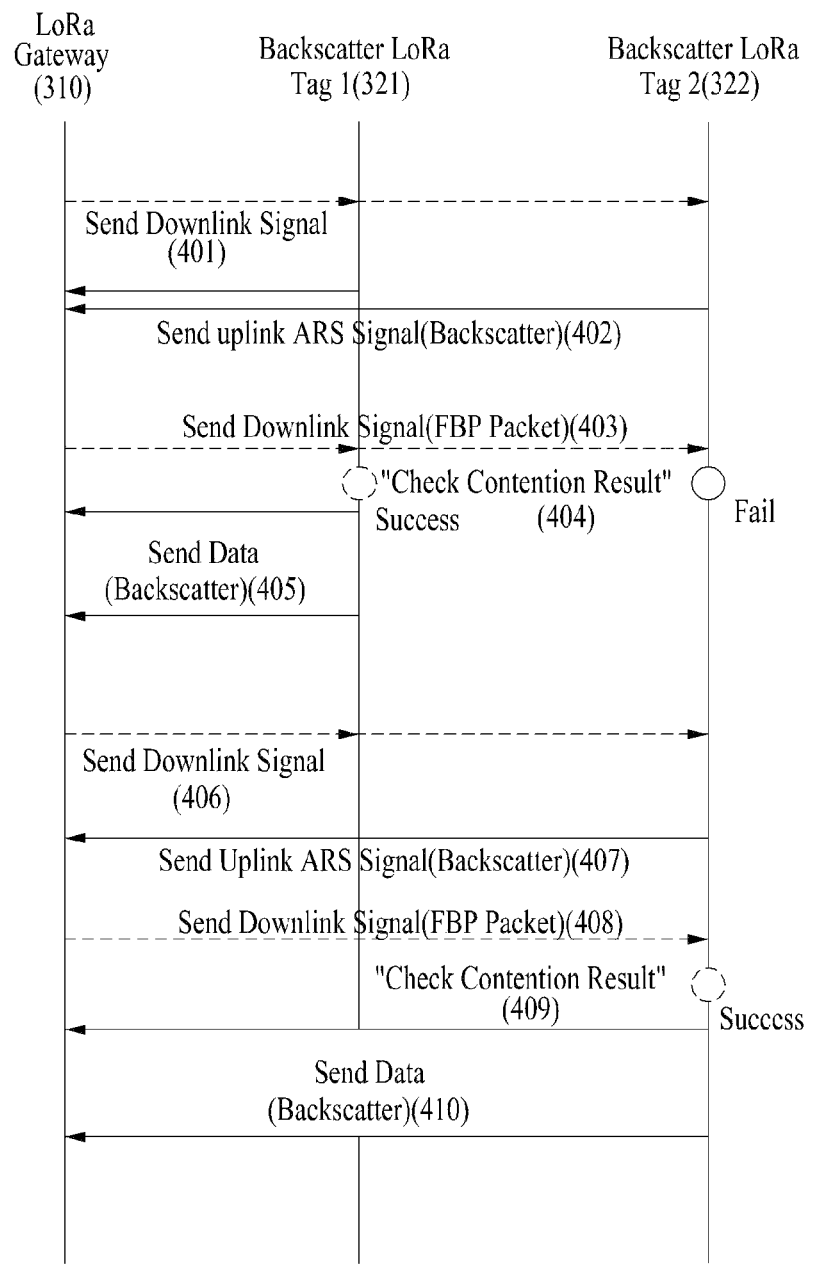
FIG. 4 is a diagram for describing an operation of a backscatter LoRa network according to an embodiment.

FIG. 4 is a diagram for describing an operation of a backscatter LoRa network according to an embodiment.

Referring to FIG. 4, in the backscatter LoRa network according to an embodiment, the LoRa gateway 310 periodically transmits a downlink signal (401). The LoRa backscatter tag 320 that has received the downlink signal transmitted by the LoRa gateway 310 may transmit an uplink ARS signal, that is, a backscatter signal, to the LoRa gateway 310 (402). Thereafter, the LoRa gateway 310 may transmit an FBP, including a result of a contention 404, through a downlink signal (403). For example, the result of the contention 404 may be indicated as a success or a fall or fail.

Accordingly, if a result of the contention 404 is a success, the LoRa backscatter tag 320 (in this case, the first LoRa backscatter tag 321) may transmit sensing data to the LoRa gateway 310 (405).

If a result of the contention 404 is a fail, the LoRa backscatter tag 320 (in this case, the second LoRa backscatter tag 322) may wait for a re-contention sequence again.

The LoRa gateway 310 transmits a downlink signal again (406). The LoRa backscatter tag 320 that has received the downlink signal transmitted by the LoRa gateway 310 may transmit an uplink ARS signal, that is, a backscatter signal, to the LoRa gateway 310 (407). Thereafter, the LoRa gateway 310 may transmit an FBP, including a result of the contention 409, through a downlink signal (408).

Accordingly, if a result of the contention 409 is a success, the LoRa backscatter tag 320 (in this case, the second LoRa backscatter tag 322) may transmit sensing data to the LoRa gateway 310 (410).

A backscatter LoRa network is described more specifically below.

Figure 5:
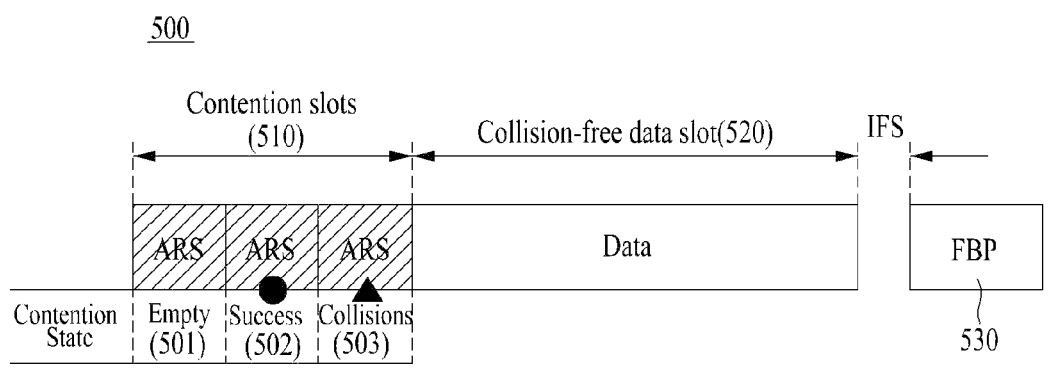
FIG. 5 is a diagram showing a DQ frame structure according to an embodiment.

FIG. 5 is a diagram showing a distributed queuing (DQ) frame structure according to an embodiment.

Referring to FIG. 5, a DQ frame 500 may be basically configured with a contention slot unit 510, a data slot (or collision-free data slot) unit 520 and a feedback packet (FBP) unit 530, which may be defined as one cycle.

The contention slot unit 510 includes a plurality of contention slots. In this case, the contention slot unit may include three contention slots as an example. The contention slot unit 510 is the section in which a contention is performed to obtain data of the data slot unit 520, and may transmit an ARS, that is, a contention tool (e.g., preamble) of a node. Furthermore, the FBP unit 530 is the section in which a result of a contention between nodes is notified, and may transmit a packet feedback packet (FBP) containing a result of a contention. In this case, the node may be the above-described LoRa backscatter tag.

A role of the queue of a node is described below. A CRQ is to determine whether to transmit an ARS in a current cycle. A DTQ is to determine whether to transmit data in a current cycle.

Each node may independently maintain and manage a DTQ and a CRQ, may participate in a contention, and may transmit data according to CRQ and DTQ rules.

If there is data to be transmitted, each node may participate in a contention by transmitting an ARS signal. After the participation in the contention, the node may receive, from a coordinator, an FBP containing a result of the contention after a predetermined time slot. In this case, the coordinator may be a LoRa network server. In some embodiments, the coordinator may be a LoRa gateway or a base station.

In this case, the FBP containing a result of the contention may include a contention state and information on the lengths of the CRQ and the DTQ. The result of the contention may include a total of three states, including an "Empty" state 501 in which a competitor is not present, a "Success" state 502 in which only a single contention candidate is present, and a "Fail (or collision)" state 503 in which multiple contention candidates are present. As described above, the FBP may include a contention state. In this case, the described contention states are merely illustrative, and the disclosure is not limited thereto.

Each node may enter a DTQ when a contention is a success based on FBP information, and may wait for a transmission sequence. Each node may enter a CRQ when a contention fails, and may wait for a sequence for a re-contention.

Figure 6:
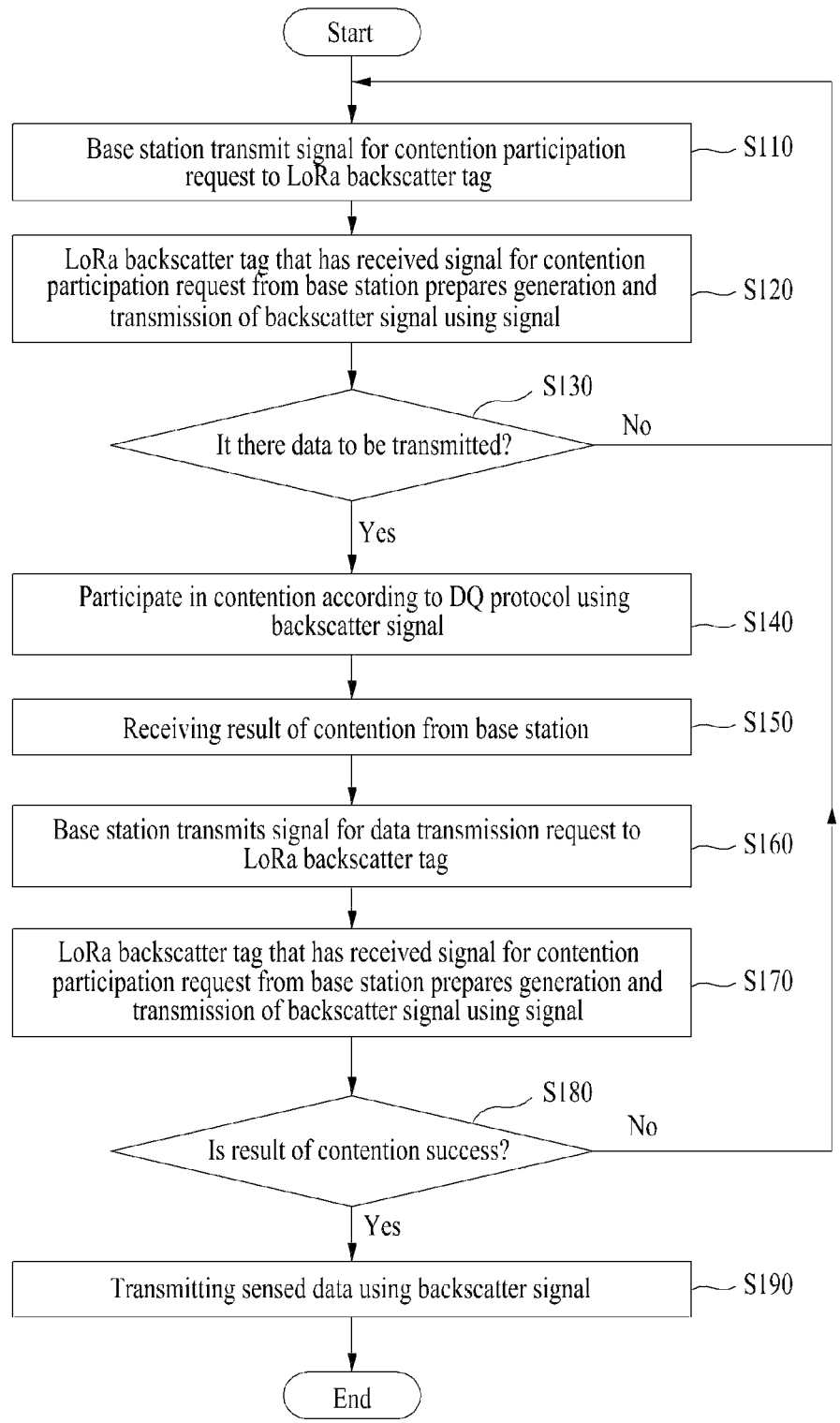
FIG. 6 is a flowchart illustrating a multi-access method for a LoRa tag using backscatter communication according to an embodiment.

FIG. 6 is a flowchart illustrating a multi-access method for a LoRa tag using backscatter communication according to an embodiment.

Referring to FIG. 6, the multi-access method for a LoRa tag using backscatter communication according to an embodiment may include receiving, by a LoRa backscatter tag, a signal for a contention participation request from a base station (S110), preparing, by the LoRa backscatter tag that has received the signal for the contention participation request from the base station, the generation and transmission of a backscatter signal using the signal for the contention participation request (S120), checking, by the LoRa backscatter tag, whether data to be transmitted is present (S130), participating in a contention, by the LoRa backscatter tag, according to a distributed queuing (DQ) protocol using the backscatter signal if data to be transmitted is present in the LoRa backscatter tag (S140), receiving, by the LoRa backscatter tag, a result of the contention from the base station (S150), checking, by the LoRa backscatter tag, whether the received result of the contention is a success (S180), and transmitting, by the LoRa backscatter tag, sensed data to the base station using the backscatter signal, if the result of the contention is a success (S190).

The multi-access method may further include receiving, by the LoRa backscatter tag, a signal for a data transmission request from the base station (S160) after receiving the result of the contention from the base station, and preparing, by the LoRa backscatter tag that has received the signal for the data transmission request from the base station, the generation and transmission of a backscatter signal using the signal for the data transmission request (S170).

Each of the steps of the multi-access method for a LoRa tag using backscatter communication according to an embodiment is described more specifically below.

At step S110, a LoRa backscatter tag may receive a signal for a contention participation request from a base station.

At step S120, the LoRa backscatter tag that has received the signal for the contention participation request from the base station may prepare the generation and transmission of a backscatter signal using the signal for the contention participation request.

At step S130, the LoRa backscatter tag may check whether data to be transmitted is present.

At step S140, if data to be transmitted is present in the LoRa backscatter tag, the LoRa backscatter tag may participate in a contention according to a distributed queuing (DQ) protocol using the backscatter signal. In this case, if data to be transmitted is present, the LoRa backscatter tag may select a contention slot, and may participate in a contention by transmitting an ARS signal. Furthermore, the LoRa backscatter tag may independently maintain and manage a CRQ and a DTQ and participate in a contention.

At step S150, the LoRa backscatter tag may receive a result of the contention from the base station. In this case, the LoRa backscatter tag may receive, from the base station, feedback packet (FBP) information including whether a result of the contention is a success.

At step S160, the LoRa backscatter tag may receive a signal for a data transmission request from the base station.

At step S170, the LoRa backscatter tag that has received the signal for the data transmission request from the base station may prepare the generation and transmission of a backscatter signal using the signal for the data transmission request.

At step S180, the LoRa backscatter tag may check whether the received result of the contention is a success.

At step S190, if the result of the contention is a success, the LoRa backscatter tag may transmit sensed data to the base station using the backscatter signal. At this time, the LoRa backscatter tag may transmit the data to the base station according to the rules of a CRQ and DTQ.

Figure 7:
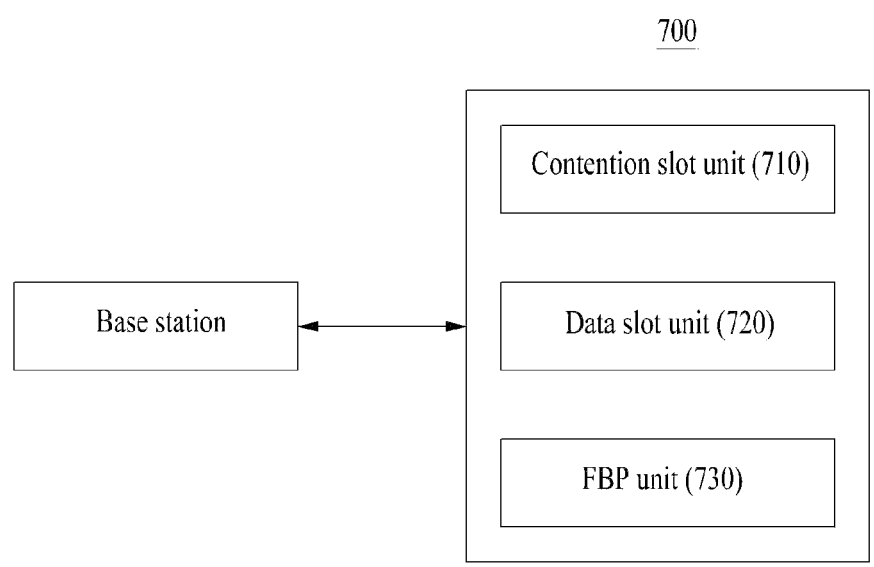
FIG. 7 is a diagram for describing a multi-access apparatus for a LoRa tag using backscatter communication according to an embodiment.

FIG. 7 is a diagram for describing a multi-access apparatus 700 for a LoRa tag using backscatter communication according to an embodiment.

Referring to FIG. 7, the multi-access apparatus 700 for a LoRa tag using backscatter communication according to an embodiment may be configured with a contention slot unit 710, a data slot unit 720 and a feedback packet (FBP) unit 730. In this case, the multi-access apparatus 700 for a LoRa tag using backscatter communication may be included in a LoRa backscatter tag or may include a LoRa backscatter tag. Furthermore, the multi-access apparatus 700 for a LoRa tag using backscatter communication may include the DQ frame described with reference to FIG. 5.

If data to be transmitted is present after a signal for a contention participation request is received from a base station, the contention slot unit 710 may participate in a contention according to a distributed queuing (DQ) protocol using a backscatter signal.

At this time, the contention slot unit 710 may check whether data to be transmitted is present in a LoRa backscatter tag, may select a contention slot if data to be transmitted is present, and may participate in a contention by transmitting an ARS signal. Furthermore, the contention slot unit 710 may independently maintain and manage a CRQ and a DTQ and participate in a contention.

The FBP unit 730 may receive a result of a contention from a base station and check whether the result of the contention is a success. At this time, the FBP unit 730 may receive, from the base station, FBP information including whether the result of the contention is a success.

If a result of a contention is a success, the data slot unit 720 may transmit sensed data to a base station using a backscatter signal. More specifically, after receiving the result of the contention from the base station, the data slot unit 720 may receive a signal for a data transmission request from the base station, and may prepare the generation and transmission of the backscatter signal using the signal for the data transmission request.

In this case, if the result of the contention is a success, the data slot unit 720 may transmit the data to the base station according to the rules of a CRQ and DTQ.

Figure 8:
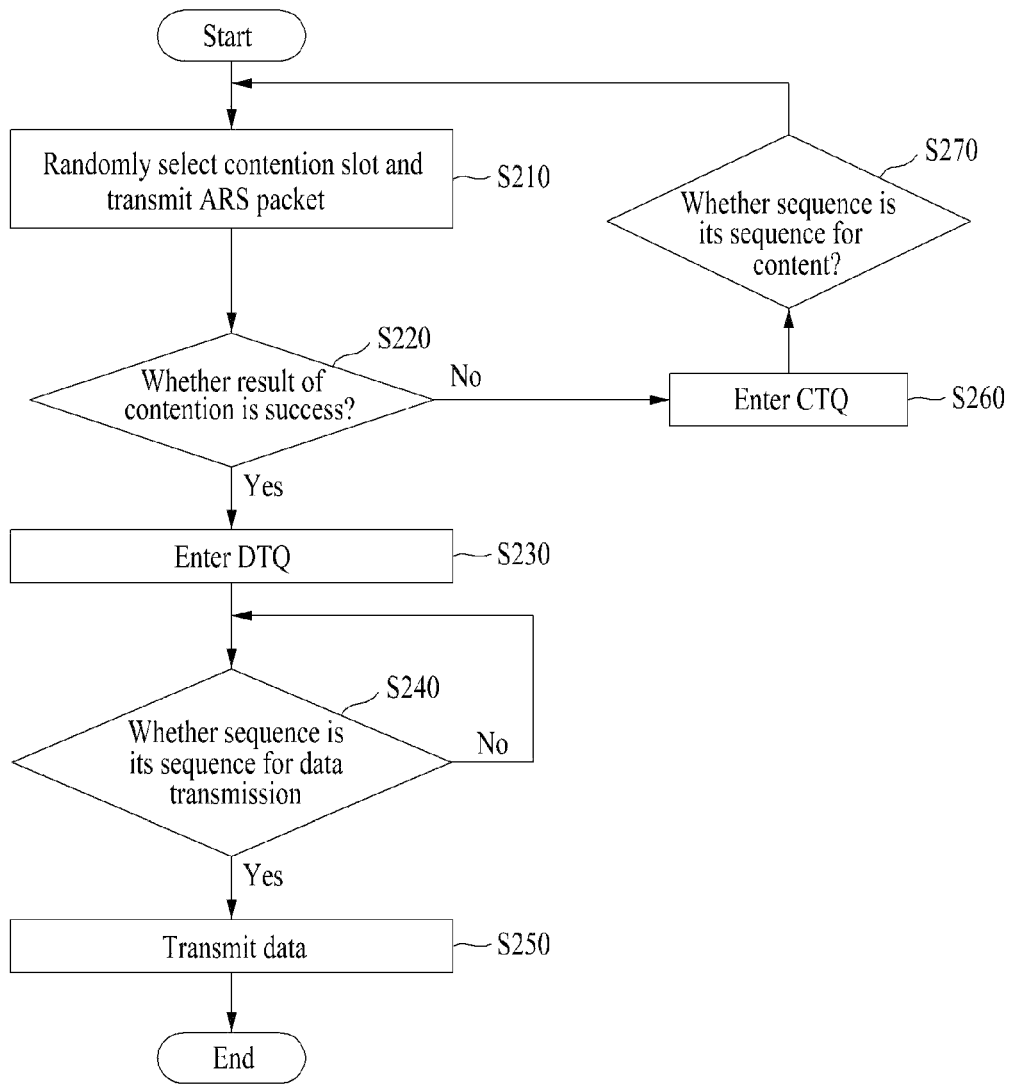
FIG. 8 is a flowchart illustrating a DQ operation of a LoRa backscatter tag according to an embodiment.

FIG. 8 is a flowchart illustrating a DQ operation of a LoRa backscatter tag according to an embodiment.

Referring to FIG. 8, after randomly selecting a contention slot, the LoRa backscatter tag may transmit an ARS packet, that is, a contention participation signal (S210). After participating in a contention, the LoRa backscatter tag may check whether a result of the contention is a success by receiving an FBP, including the result of the contention, from a LoRa backscatter gateway (or base station) (S220).

If the result of the contention is a success, the LoRa backscatter tag may enter a DTQ (S230), may check whether a sequence is its sequence for data transmission (S240), and may transmit the data (S250). If the sequence is not its sequence, the LoRa backscatter tag may wait for its sequence.

Furthermore, if the result of the contention fails, the LoRa backscatter tag may enter a CTQ (S260), and may check whether a sequence is its sequence in which the LoRa backscatter tag will transmit data (S270). If the sequence is its sequence for a contention, the LoRa backscatter tag may randomly select a contention slot again, and may participate in a contention by transmitting an ARS packet, that is, a contention participation signal (S210).

The LoRa backscatter tag may be a multi-access apparatus for a LoRa tag using backscatter communication or may be included in a multi-access apparatus for a LoRa tag using backscatter communication.

Figure 9:
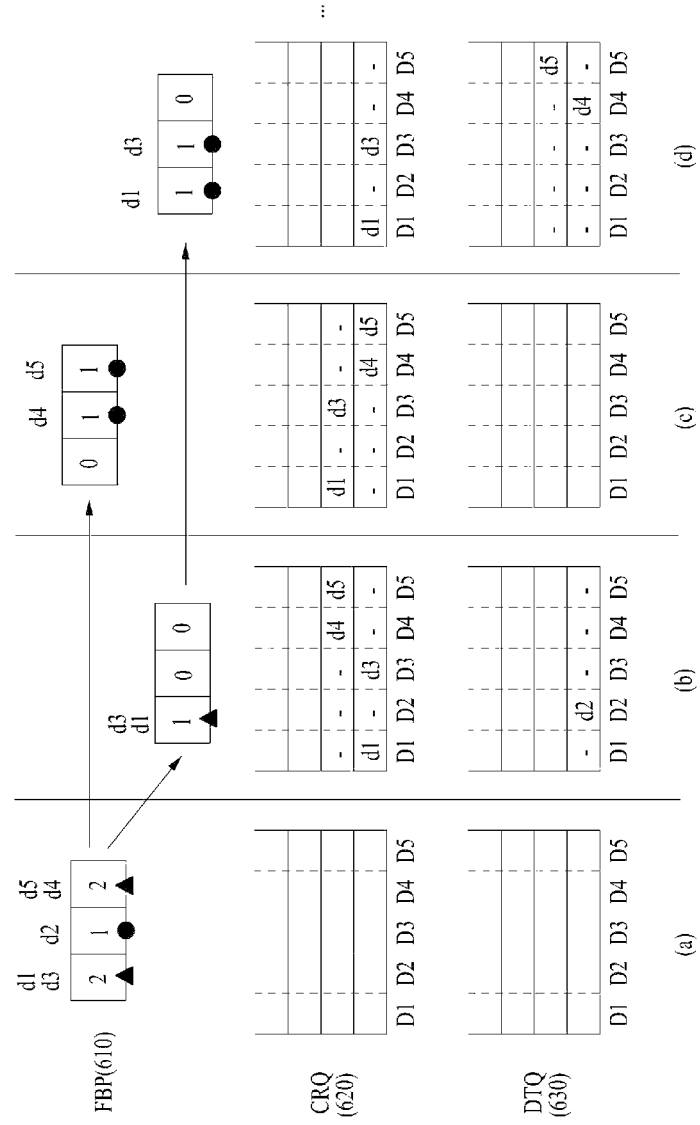
FIG. 9 is a diagram showing an example of a DQ operation of a LoRa backscatter tag according to an embodiment.

FIG. 9 is a diagram showing an example of a DQ operation of a LoRa backscatter tag according to an embodiment.

FIG. 9 shows an example of five nodes D1, D2, D3, D4, and D5 which participate in contentions until traffic is solved so that a DQ process can be easily understood. In this case, the CRQ 920 and DTQ 930 state of each node are illustrated. Each node performs a contention or data transmission in its sequence every DQ cycle, and a result thereof may be represented in an FBP 910.

FIG. 9(a) shows the state in which the five nodes D1, D2, D3, D4, and D5 first participate in a contention and all the CRQs 920 and DTQs 930 have been initialized. Accordingly, each node participates in a contention by transmitting an ARS packet, and the remaining nodes D1, D3, D4, and D5 except the node D2 may receive a "Fail" state, that is a result of the contention. Accordingly, in FIG. 9(b), the node D2 enters the DTQ 930, and the remaining nodes D1, D2, D3, D4, and D5 may enter the CRQs 920 and attempt a contention.

As described above, each node may participate in a contention by transmitting an ARS signal if data to be transmitted is present, and may receive, from a coordinator, the FBP 910 containing a result of the contention. If the contention is a success (e.g., node D2) based on information of the received FBP 910, the node D2 may enter the DTQ 930 and transmit data. If the contention fails (e.g., nodes D1, D3, D4 and D5), the nodes D1, D3, D4 and D5 may enter the CRQs 920 again and attempt a contention.

The above-described apparatus may be implemented as a hardware component, a software component and/or a combination of them. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure the processor so that it operates as desired or may instruct the processor independently or collectively. The software and/or data may be embodied in a machine, component, physical device, virtual equipment or computer storage medium or device of any type or a transmitted signal wave permanently or temporarily in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may have been known to those skilled in the computer software. The computer-readable recording medium includes magnetic media such as a hard disk, a floppy disk and a magnetic tape, optical media such as a CD-ROM and a DVD, magneto-optical media such as a floptical disk, and hardware devices specially configured to store and execute program instructions, such as ROM, RAM, and flash memory, for example. Examples of the program instruction may include high-level language code executable by a computer using an interpreter in addition to machine-language code, such as code written by a compiler.

According to the embodiments, there can be provided the multi-access method and apparatus for a LoRa tag using backscatter communication capable of multi-access without a collision by enabling participation in a contention according to a distributed queuing (DQ) protocol using a backscatter signal.

According to the embodiments, there can be provided the multi-access method and apparatus for a LoRa tag using backscatter communication, in which when a LoRa gateway periodically transmits a signal, a LoRa backscatter tag that has received the signal participates in a contention by transmitting an ARS signal and transmits data based on a received result of the contention.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments, and equivalents of the claims belong to the scope of the claims.

What is claimed is:

1. A multi-access apparatus for a LoRa tag using backscatter communication, comprising:
   a contention slot unit configured to receive a signal for a contention participation request from a base station as the base station periodically transmits a downlink signal, prepare a generation and transmission of a backscatter signal which is an uplink signal using the signal for the contention participation request, check whether data to be transmitted is present, and participate in a contention according to a distributed queuing (DQ) protocol using the backscatter signal if data to be transmitted is present;
   a feedback packet (FBP) unit configured to receive a result of the contention from the base station and check whether the result of the contention is a success; and
   a data slot unit configured to transmit sensed data to the base station using the backscatter signal if the result of the contention is a success,
   wherein after receiving the result of the contention from the base station, the data slot unit receives a signal for a data transmission request from the base station, prepares a generation and transmission of a backscatter signal using the signal for the data transmission request, and transmits the data sensed to the base station using the backscatter signal if the result of the contention is a success, and
   wherein the contention slot unit independently maintains and manages a conflict resolution queue (CRQ) and a data transmission queue (DTQ) and participates in a contention.

2. The multi-access apparatus of claim 1, wherein the contention slot unit is configured to:
   check whether the data to be transmitted is present in a LoRa backscatter tag,
   select a contention slot if the data to be transmitted is present, and
   participate in a contention by transmitting an access request sequence (ARS) signal.

3. The multi-access apparatus of claim 1, wherein the FBP unit is configured to receive, from the base station, FBP information including whether the result of the contention is a success.

4. The multi-access apparatus of claim 1, wherein the data slot unit is configured to transmit the data to the base station according to rules of the CRQ and DTQ if the result of the contention is a success.

5. A multi-access method for a LoRa tag using backscatter communication, comprising:
   receiving, by a LoRa backscatter tag, a signal for a contention participation request from a base station as the base station periodically transmits a downlink signal;
   preparing, by the LoRa backscatter tag that has received the signal for the contention participation request from the base station, a generation and transmission of a backscatter signal which is an uplink signal using the signal for the contention participation request;
   checking, by the LoRa backscatter tag, whether data to be transmitted is present;

participating, by the LoRa backscatter tag, in a contention according to a distributed queuing (DQ) protocol using the backscatter signal if the data to be transmitted is present in the LoRa backscatter tag;

receiving, by the LoRa backscatter tag, a result of the contention from the base station;

checking, by the LoRa backscatter tag, whether the result of the contention is a success; and transmitting, by the LoRa backscatter tag, sensed data to the base station using the backscatter signal if the result of the contention is a success, wherein the multi-access method further comprises:

receiving, by the LoRa backscatter tag, a signal for a data transmission request from the base station after receiving the result of the contention from the base station; and preparing, by the LoRa backscatter tag that has received the signal for the data transmission request from the base station, a generation and transmission of a backscatter signal using the signal for the data transmission request, and wherein participating, by the LoRa backscatter tag, in the contention according to the DQ protocol using the backscatter signal comprises independently maintaining and managing, by the LoRa backscatter tag, a conflict resolution queue (CRQ) and a data transmission queue (DTQ) and participating in the contention.

6. The multi-access method of claim 5, wherein participating, by the LoRa backscatter tag, in the contention according to the DQ protocol using the backscatter signal comprises:

selecting, by the LoRa backscatter tag, a contention slot if the data to be transmitted is present, and participating in the contention by transmitting an access request sequence (ARS) signal.

7. The multi-access method of claim 5, wherein receiving, by the LoRa backscatter tag, the result of the contention from the base station comprises receiving, by the LoRa backscatter tag, feedback packet (FBP) information including whether the result of the contention is a success from the base station.

8. The multi-access method of claim 5, wherein transmitting, by the LoRa backscatter tag, the sensed data to the base station using the backscatter signal if the result of the contention is a success comprises transmitting the data to the base station according to rules of the CRQ and DTQ.

* * * * *